United States Patent
Claes

(12) United States Patent (10) Patent No.: US 6,460,939 B1
(45) Date of Patent: *Oct. 8, 2002

(54) LIGHT ALLOY BICYCLE RIM

(75) Inventor: Ivo Joanna Hubert Claes, Knokke-Heist (BE)

(73) Assignee: "Alesa", "L'Alliagi Leger et Ses Applications", Schoten (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 12 days.

(21) Appl. No.: 09/101,380
(22) PCT Filed: Jan. 12, 1996
(86) PCT No.: PCT/BE96/00003
§ 371 (c)(1), (2), (4) Date: Jul. 9, 1998
(87) PCT Pub. No.: WO97/26143
PCT Pub. Date: Jul. 24, 1997

(51) Int. Cl.[7] .............................................. B60B 21/00
(52) U.S. Cl. ............................ 301/95.101; 301/95.108
(58) Field of Search .............................. 301/58, 95, 96, 301/97, 98, 33, 30; 188/24.11, 24.12, 344, 1.11 R, 1.11 W; 116/208; 152/154.2

(56) References Cited

U.S. PATENT DOCUMENTS

| | | | | |
|---|---|---|---|---|
| 3,362,376 A | * | 1/1968 | Norton | 152/154.2 |
| 3,433,327 A | * | 3/1969 | Regis | 188/24.13 |
| 3,516,467 A | * | 6/1970 | Sims | 152/154.2 |
| 3,732,951 A | * | 5/1973 | Hata et al. | 301/97 |
| 3,814,160 A | * | 6/1974 | Creasey | 152/154.2 |
| 4,317,479 A | * | 3/1982 | McDonald | 152/154.2 |
| 4,982,767 A | * | 1/1991 | Pezzoli et al. | 188/1.11 R |
| 5,470,133 A | * | 11/1995 | Kuo et al. | 301/95 |
| 5,653,510 A | * | 8/1997 | Osborne | 301/95 |
| 5,939,978 A | * | 8/1999 | Kyrtsos | 188/1.11 R |
| 5,941,606 A | * | 8/1999 | Chen | 301/58 |
| 5,975,646 A | * | 11/1999 | Campagnolo | 301/95 |
| 5,980,668 A | * | 11/1999 | Slingluff | 152/154.2 |

* cited by examiner

Primary Examiner—S. Joseph Morano
Assistant Examiner—Long Bao Nguyen
(74) Attorney, Agent, or Firm—Dorsey & Whitney LLP

(57) ABSTRACT

A bicycle wheel rim can be worn down by rim brakes, leading to serious accidents. The present invention relates to a novel bicycle rim that provides direct and clear indication to a rider when a braking surface on the rim has been worn off. The novel bicycle rim comprises a base portion, two lateral flanks forming an outer braking surface, and a longitudinal hole. The braking surface has a first portion and a second portion. The first portion of the braking surface has a thickness that is designed to be worn off down to the longitudinal hole so as to form a visible slit, while the second portion, situated radially outwards with respect to the first portion, has a thickness such as to prevent deformations of the second portion when the first portion is worn off down to the longitudinal hole.

9 Claims, 2 Drawing Sheets

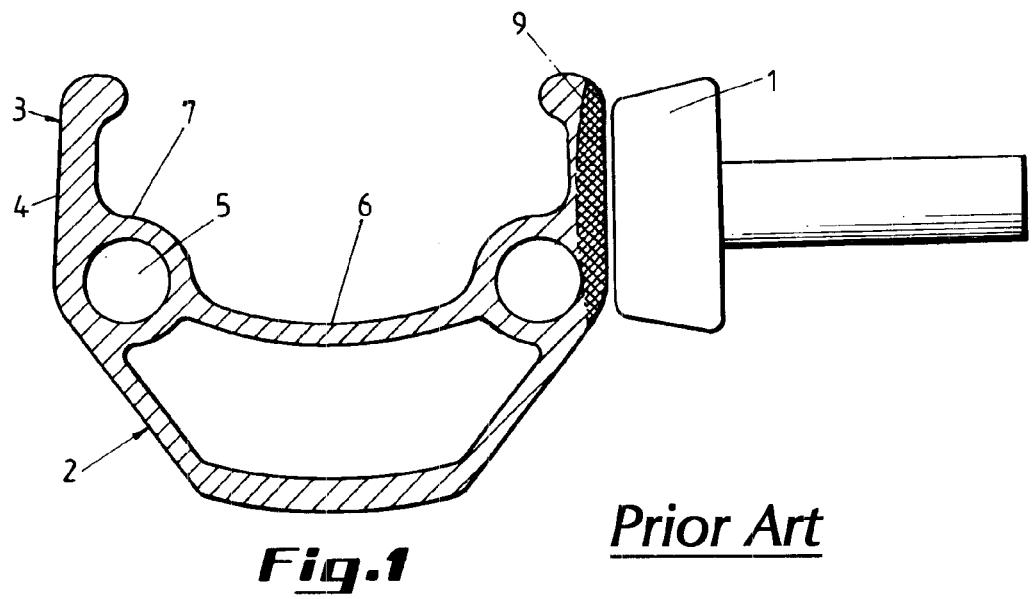
Fig.1 *Prior Art*
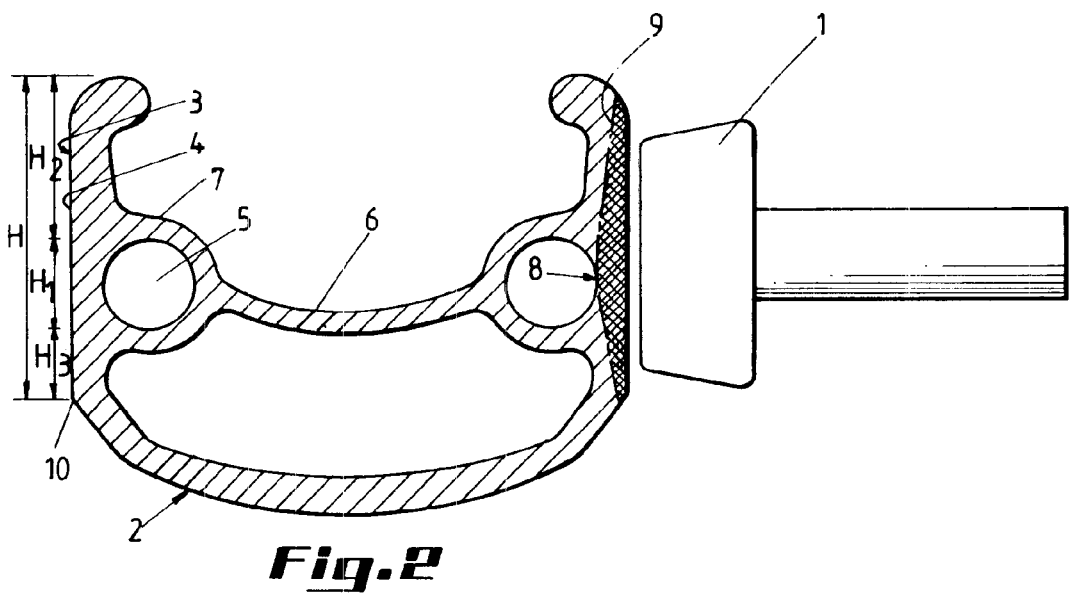
Fig.2

LIGHT ALLOY BICYCLE RIM

The present invention relates to a light alloy bicycle rim comprising a base portion, two lateral flanks forming an outer braking surface, and a longitudinal hole provided along said lateral flanks and extending over a first portion of the height of the braking surface.

Such a bicycle rim is generally known. This known rim is formed of an extruded profile showing pinholes along the lateral flanks to join both ends of the profile by means of pins which are pressed in the pinholes. These pinholes are located at the transition between the base portion and the lateral flanks.

A drawback of the existing light alloy bicycle rims is that, due to the use of more abrasive rim brakes, the braking surfaces are subjected to considerable wear which may result after prolonged use in a destruction of the rim. More particularly, the outer peripheral portion of the lateral flanks may break off, or may bend outwards under the pressure of the tire, and may get stuck between the rim brakes. At the same time the tire will come off the rim. It is clear that this is a dangerous situation which may lead to serious accidents.

In order to avoid such accidents it has already been proposed to make an outer cut in the braking surface or to punch recesses therein. In this way, the user has an indication of the progress of the wear of the braking surfaces. However, even when the applied cut or recesses have completely disappeared, there is no real incentive to replace the rim or, in other words, there is no direct indication of the dangerous situation.

An object of the present invention is therefore to provide an original rim concept which clearly indicates when the braking surface has been worn off.

To this end, the light alloy bicycle rim according to the invention is characterized in that the first portion of the braking surface is arranged to be worn off down to the longitudinal hole so as to form a visible slit whilst a second portion of the height of the braking surface, situated radially outwards with respect to the first portion, has a thickness such that it maintains its strength when said first portion is worn off, said lateral flanks being further reinforced to prevent them from bending outwards when the braking surface is worn off down to the longitudinal hole.

In contrast to the known wear indicators set forth hereinabove, the wear of the bicycle rim according to the invention is indicated by the appearance of a visible slit in the braking surface. When such a slit is formed in the braking surface, it is immediately clear that the rim is worn off. The rim according to the present invention provides thus a clear indication that it should be replaced before any dangerous situation arises.

In practice there exists already bicycle rims having lateral flanks formed by an entirely hollow profile. When the outer wall of this hollow profile, which forms the braking surface is worn off, the strength of this profile is lost. This is especially due to the fact that the rim brake will push the braking surface inwards so that the inner wall of the hollow profile is not supported any more and will thus bend outwards under the pressure of the tire.

In a particular embodiment of the present invention, said longitudinal hole is a pinhole provided for forming a pin joint between the two extremities of the rim profile.

In this embodiment no additional longitudinal holes have to be provided along the flanks of the bicycle rim. An advantage of this embodiment is further that it provides an additional indication of the fact that the braking surfaces are worn off. Indeed, when the braking surfaces are worn off down to the pins of the pin joint, this will be felt upon braking, i.e. a shocking braking effect will be obtained.

In a preferred embodiment, a resilient element is pressed in said longitudinal hole, more particularly in the pinhole near the pin joint.

In this way said shocking braking effect will be achieved by this resilient element and will even be more pronounced than the shocking effect caused by the pins of the pin joint due to the higher frictional forces between the resilient element and the rim brake.

Further particularities and advantages of the present invention will become apparent from the following description of some particular embodiments of the bicycle rim according to the invention. This description is only given as an example and is clearly not intended to limit the scope of the present invention. The reference numerals used in the description refer to the annexed drawings wherein:

FIG. 1 shows a cross-sectional view of a prior art light alloy bicycle rim and of a brake shoe cooperating therewith.

FIG. 2 shows a cross-sectional view of a light alloy bicycle rim according to the present invention and of a brake shoe cooperating therewith.

In these different figures, the same reference numerals refer to identical or analogous elements.

Figure 3:
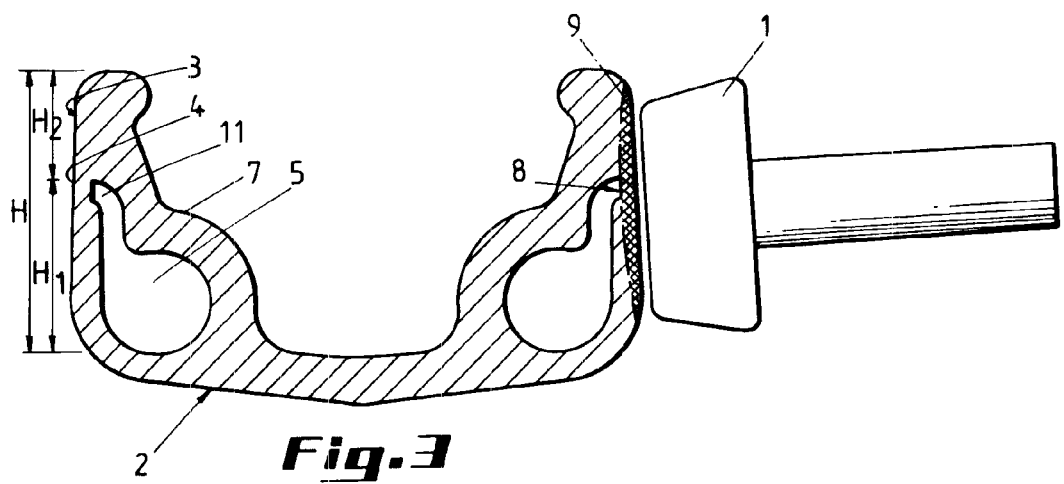
FIG. 3 is a cross-sectional view analogous to FIG. 2 but relating to another possible embodiment of the bicycle rim according to the invention.

As set forth hereinabove, prior art light alloy bicycle rims, in particular aluminium alloy rims, may cause dangerous situations since they wear off relatively quickly, especially when use is made of highly abrasive rim brake shoes. FIG. 1 shows such a prior art bicycle rim and a rim brake shoe 1 cooperating therewith.

The bicycle rim shown in the figures comprises a base portion 2 and two lateral flanks 3 adjacent to the base portion 2 so as to form a generally U-shaped cross-section. The lateral flanks 3 show an outer braking surface 4 destined for cooperating with the rim brake shoes 1. Further a so-called pinhole 5 is provided for making a pin joint between both extremities of the normally extruded rim profile. Both pinholes 5 are mutually connected by a web 6 to reinforce the profile and they usually provide a seat 7 for the tire beads.

In FIGS. 1–3, the wear of the rim caused by the rim brake shoe 1 has been indicated schematically by a curved recess 9 in one of the lateral flanks 3. For clarity's sake, no brake shoe has been indicated at the other lateral flank 3 but it will be clear that this latter flank 3 will also cooperate with a brake shoe 1 and will thus also be subjected to wear.

The curved recess 9 is only a schematic representation of the wear but is based on experimental data. The actual wear will in practice however depend on a number of factors, such as the abrasion resistance of the flanks, the rigidity and structure of the brake shoes, etc., and may thus show a more or less pronounced curvature which will generally not be as regular as shown in the figures.

On the basis of this schematic representation, it will be clear that in the prior art bicycle rim of FIG. 1, the lateral flanks 3 will bend outwards or may even break off before the braking surface 4 is worn off down to the pinhole 5. This prior art rim provides thus no visual indication of the dangerous situation which arises when the braking surface is worn off.

In contrast to the shown prior art rim, the rim according to the invention does provide such a visual indication. In general, the pinhole 5, or another longitudinal hole provided along the lateral flanks 3 of the rim according to the invention extends only over a first portion $H_1$ of the height H of the braking surface 4. According to the invention, the second portion $H_2$ of the height H of the braking surface 4, situated radially outwards with respect to the first portion $H_1$, has to have a thickness such that it maintains its strength when the first portion $H_1$ is worn off down to the pinhole 5. This is schematically shown in FIGS. 2 and 3. The lateral flanks 3 should further be reinforced to prevent them from bending outwards under the pressure of the type when the braking surface 4 is worn off down to the pinhole 5. In the embodiment shown in FIG. 2, this is achieved by the web 6 between the pinholes 5. This web 6 could however also be provided between the second portions of the flanks 3 themselves. The required reinforcement can further be obtained by an additional support between the pinhole 5 and the base portion 2 or by an increased wall thickness of the pinhole 5 as shown in FIG. 3. In the rims according to the present invention, a visible slit will thus be formed in the braking surface 4 when this surface is worn off, providing a clear warning in case the rim has been worn off. The location where the visible slit will be formed has been indicated in FIGS. 2 and 3 by arrow 8.

In the embodiments shown in FIGS. 2 and 3, the thickness of the second portion $H_2$ of the braking surface 4 increases towards the pinhole 5. As set forth hereinabove, it has been found experimentally that due to the wear, a generally curved recess will be formed in the braking surface 4 so that less material is required in these embodiments to retain the strength of the second portion $H_2$.

The thickness of this second portion $H_2$ of the braking surface 4, measured near the pinhole 5, will in particular comprise at least 120 percent of the thickness at the level of the pinhole 5 and preferably from about 140 to about 160 percent of this latter thickness. These thicknesses may be smaller in case one would consider to use a hollow structure for the second portion. In such a case, the second portion of the braking surface, i.e. the outer wall of this hollow structure, may be for example 0.1 to 0.3 mm thicker near the pinhole 5 than the first portion at the level of the pinhole. Without additional reinforcement of the second portion of the braking surface, this second portion should for example be 0.4 to 1.0 mm, and more particularly 0.6 to 0.8 mm thicker near the pinhole 5 than the first portion at the level of the pinhole.

In view of the generally curved recess which will be formed upon prolonged wear of the braking surface, the pinhole 5 or another longitudinal hole is located ideally such that the slit which will be formed into this longitudinal hole will be situated at a level of about 50% of the height of the braking surface. In this way, the amount of material required to achieve the required thickness of the second portion $H_2$ of the braking surface 4 and of a third portion $H_3$ of the braking surface 4, situated radially inwards with respect to the first portion $H_1$ can be kept to a minimum. In general, the slit formed upon prolonged wear of the braking surface 4, will be located at a distance of 20 to 80% and more particularly of 25 to 65% of the height H of the braking surface from the edge 10 thereof situated adjacent to the base portion 2.

In a preferred embodiment, the slit 8 will be located at a distance of 25 to 40% of the height of the braking surface 4 from the edge 10. An advantage of this preferred embodiment is that, in view of the standard height of the flanks 3 above the tire seat 6 usually formed by the pinhole 7, no important increase of the height of the braking surface 4 is involved as can be seen in FIG. 2.

FIG. 3 shows a variant embodiment of the bicycle rim according to the invention. In this embodiment, the pinhole 5 is situated, just as in the prior art, in the corner between the base portion 2 and the lateral flank 3 but shows an extension 11 which extends towards the middle of the braking surface 4. In this way, a visible slit 8 will be formed into this extension 11 upon prolonged wear before the lateral flanks 3 loose their required strength.

In the above described embodiments, a further indication of the fact that the rim is worn off can be felt upon breaking. Indeed, the pins of the pin joint will act on the brake shoes 1 and will thus cause a shocking braking effect.

Figure 4:
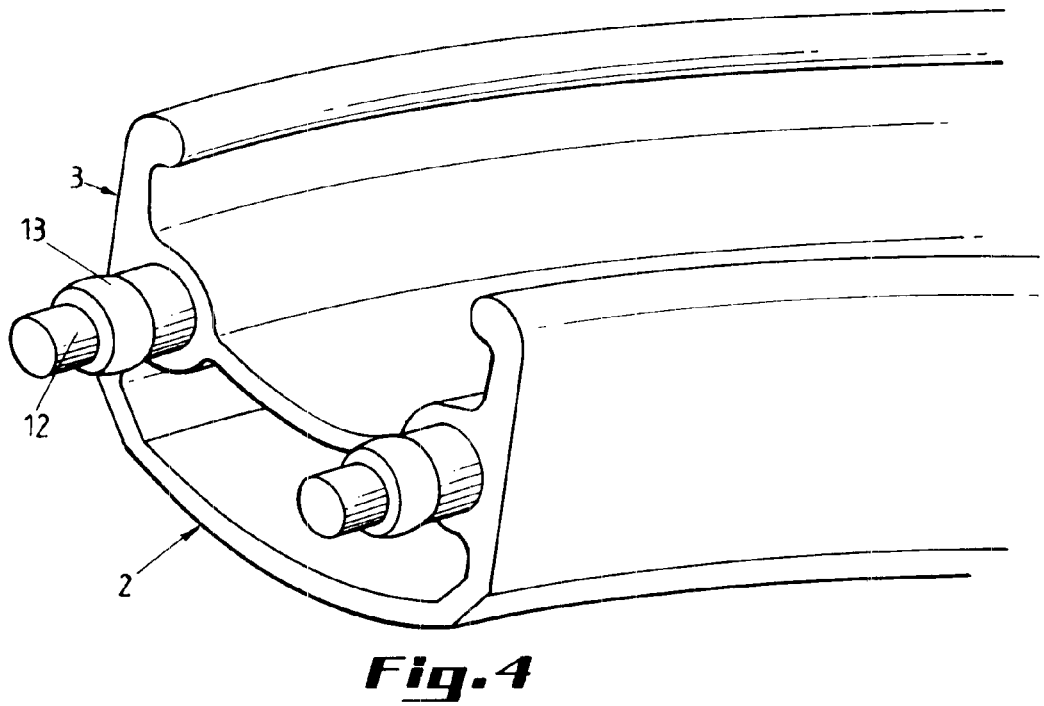
FIG. 4 shows a perspective view of one extremity of the rim profile shown in FIG. 2 comprising the pins of the pin joint.

In order to enhance this effect, a resilient element may be pressed in the longitudinal hole, in particular in the pinhole 5 near the pin joint as shown in FIG. 4. Such a resilient element can also be pressed in the longitudinal hole 5 in case this is not used as a pinhole, for example in case both extremities of the rim are welded together. In the embodiment shown in FIG. 4, the pins 12 are arranged to carry a resilient element 13, for example a rubber sleeve or a rubber cap, and to push this element 13 into the pinhole 5 when making the pin joint. The free extremity of the pins 12 have for example a reduced diameter so that the resilient element 13 can be slid thereover. By the force exerted by the pins 12 when pushing the elements 13 into the pinhole 5, these elements will be compressed between the wall of the pinhole 5 and the pins 12. When a slit 8 will be formed in the braking surface 4 due to prolonged wear, the presence of the resilient element 13 projecting somewhat out of the slit 8 will cause an irregular braking or in other words a shocking effect. This effect can be felt very clearly and is thus a further indication of a prolonged wear of the braking surfaces 4.

From the above description it will be clear that the invention is not limited to the described embodiments but that all kinds of modifications could on the contrary be applied thereto without leaving the scope of the annexed claims, in particular as to the possible shapes of the rim.

In the shown embodiments, the braking surfaces 4 on the rim define for example a mutual angle of 0°, or are in other words parallel to one another. These braking surfaces may however be disposed under an angle with respect to one another which will normally be smaller than 15°, and preferably smaller than 10°, to achieve the desired braking effect.

Further, as already indicated hereinabove, the longitudinal hole does not necessarily have to be formed by a pinhole, for example in case the rim comprises one or two further holes for making the pin joint or in case both extremities of the rim are welded together.

What is claimed is:

1. A light alloy bicycle rim comprising a base portion, two lateral flanks forming an outer braking surface, and a longitudinal hole provided along said lateral flanks and extending over a first portion of the height of the braking surface; said first portion of the height of the braking surface comprises a wall having a thickness corresponding to a shortest distance between the longitudinal hole and the braking surface; said wall is designed to be worn off down to the longitudinal hole so as to form a visible slit, while a second portion of the height of the braking surface, situated radially outwards with respect to the first portion, has a thickness such as to prevent deformations of the second portion when the first portion is worn off down to the longitudinal hole; said lateral flanks being further reinforced to prevent them from bending outwards when the braking surface is worn off down to the longitudinal hole.

2. The bicycle rim as claimed in claim 1, wherein when said first portion is worn off down to the longitudinal hole, the formed slit is located at a distance of 20 to 80% of the height of the braking surface from the edge thereof situated adjacent the base portion.

3. A bicycle rim as claimed in claim 2, wherein when said first portion is worn off down to the longitudinal hole, the formed slit is located at a distance of 25 to 65% of the height of the braking surface from the edge thereof situated adjacent the base portion.

4. A bicycle rim as claimed in claim 3, wherein when said first portion is worn off down to the longitudinal hole, the formed slit is located at a distance of 25 to 40% of the height of the braking surface from the edge thereof situated adjacent the base portion.

5. A bicycle rim as claimed in claim 1, wherein the thickness of said second portion of the braking surface increases towards the longitudinal hole.

6. A bicycle rim as claimed in claim 1, wherein the thickness of said second portion of the braking surface comprises near said longitudinal hole at least 120 percent of the thickness of the wall of said first portion of the braking surface, and preferably from about 140 to about 160 percent of the thickness of the wall of said first portion of the braking surface.

7. A bicycle rim as claimed in claim 1, wherein said second portion of the braking surface is 0.4 to 1.0 mm, and more particularly 0.6 to 0.8 mm, thicker near said longitudinal hole than the thickness of the wall of said first portion of the braking surface.

8. A bicycle rim as claimed in claim 1, wherein said longitudinal hole has an increased wall thickness to reinforce the flanks so as to prevent them from bending outwards when the braking surface is worn off down to the longitudinal hole.

9. A bicycle rim as claimed in claim 1, wherein the flanks of the rim are reinforced by means of a reinforcing web provided transversely between said flanks, in particular between said longitudinal holes.

\* \* \* \* \*